US009726292B2

(12) United States Patent
Stirnemann et al.

(10) Patent No.: US 9,726,292 B2
(45) Date of Patent: Aug. 8, 2017

(54) SEAL RINGS (71) Applicant: Saint-Gobain Performance Plastics L+S GMBH, Wertheim (DE)

(72) Inventors: Duane Stirnemann, Orion, MI (US); Mirco Gronitzki, Wertheim (DE)

(73) Assignee: SAINT-GOBAIN PERFORMANCE PLASTICS L+S GMBH, Wertheim (DE)

( * ) Notice: Subject to any disclaimer, the term of this patent is extended or adjusted under 35 U.S.C. 154(b) by 0 days.

(21) Appl. No.: 15/142,214

(22) Filed: Apr. 29, 2016

(65) Prior Publication Data

US 2016/0319937 A1 Nov. 3, 2016

Related U.S. Application Data (60) Provisional application No. 62/155,715, filed on May 1, 2015, provisional application No. 62/199,788, filed on Jul. 31, 2015.

(51) Int. Cl.
*F16J 9/24* (2006.01)
*F16J 15/3268* (2016.01)
*F16J 15/3284* (2016.01)
*F16J 15/06* (2006.01)

(52) U.S. Cl.
CPC ............. *F16J 15/3268* (2013.01); *F16J 9/24* (2013.01); *F16J 15/061* (2013.01); *F16J 15/3284* (2013.01)

(58) Field of Classification Search
CPC .................... F16J 15/326854; F16J 15/56
See application file for complete search history.

(56) References Cited

U.S. PATENT DOCUMENTS

| 639,363 A | 12/1899 | Dockum |
| 1,777,501 A | 10/1930 | Niethamer |
| 1,860,025 A * | 5/1932 | Good ..................... F16J 9/06 |
| | | 277/445 |
| 2,003,764 A | 6/1935 | Welch |
| 5,295,549 A | 3/1994 | Dolezal et al. |

(Continued)

FOREIGN PATENT DOCUMENTS

| FR | 2774726 A1 | 8/1999 |
| WO | 2015014786 A1 | 2/2015 |
| WO | 2016177642 A1 | 11/2016 |

OTHER PUBLICATIONS

International Search Report for PCT/EP2016/059634 dated Jul. 22, 2016, 9 pages.

*Primary Examiner* — Gilbert Lee
(74) *Attorney, Agent, or Firm* — Chi S. Kim; Abel Law Group, LLP (57) ABSTRACT A seal ring including a body having an inner surface, an outer surface, and a first side surface, and a tab extending from the body and adapted to prevent rotation of the seal ring relative to a component receiving the tab, wherein the tab extends radially inward beyond the inner surface and axially beyond the first side surface. In an embodiment, the seal ring further includes a relief portion adapted to accommodate a tab of an adjacent sealing ring such that the first side surface of a seal ring directly contacts the second side surface of the adjacent seal ring. In an embodiment, the tab locks the seal ring from rotational movement in relation to a first component.

7 Claims, 8 Drawing Sheets

(56) References Cited

U.S. PATENT DOCUMENTS

| | | | |
|---|---|---|---|
| 6,173,969 | B1 | 1/2001 | Stoll et al. |
| 6,679,678 | B2 | 1/2004 | Giesler et al. |
| 7,461,907 | B2 | 12/2008 | Plantan et al. |
| 2006/0273524 | A1 | 12/2006 | Weber et al. |
| 2011/0135445 | A1* | 6/2011 | Turnquist ............... F16J 15/324 415/110 |
| 2014/0298984 | A1* | 10/2014 | Hofbauer ................... F16J 9/24 92/169.1 |
| 2015/0048574 | A1 | 2/2015 | Seki et al. |

\* cited by examiner

SEAL RINGS

CROSS-REFERENCE TO RELATED APPLICATION(S)

This application claims priority under 35 U.S.C. §119(e) to U.S. Patent Application No. 62/155,715 entitled "SEAL RINGS," by Duane Stirnemann and Mirco Gronitzki, filed May 1, 2015, and U.S. Patent Application No. 62/199,788 entitled "SEAL RINGS," by Duane Stirnemann and Mirco Gronitzki, filed Jul. 31, 2015, which are assigned to the current assignee hereof and incorporated herein by reference in their entirety.

FIELD OF THE DISCLOSURE

The present disclosure relates to seals, and more particularly to seal rings having tabs for interlocking arrangement.

RELATED ART

Seal rings are typically used to prevent leakage from occurring within an annulus formed between two components. For example, a seal ring may be positioned between a shaft and a bore to maintain different fluidic pressures or to separate different fluidic components on opposing sides of the seal. Seal rings are typically shipped, stored, and handled in batches including multiple discrete seals stacked or arranged relative to one another. During shipping, storage, and handling the seals can unstack or move, making them difficult to manage. The industry continues to demand improved seals which facilitate easier handling and usage.

BRIEF DESCRIPTION OF THE DRAWINGS

Embodiments are illustrated by way of example and are not intended to be limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sealing arts.

A seal ring in accordance with one or more embodiments described herein can generally include a body having an inner surface, an outer surface, and a first side surface. A tab can extend from the body radially inward beyond the inner surface of the body and axially beyond the first side surface of the body. In a particular embodiment, the body of the seal ring can further include a relief portion. In an assembled state, a relief portion of a first seal ring can accommodate a tab of a second seal ring coaxially disposed adjacent to the first seal ring. Thus, a plurality of stacked seal rings can be assembled where each seal includes a tab extending axially beyond the first side surfaces of the bodies.

Figure 1:
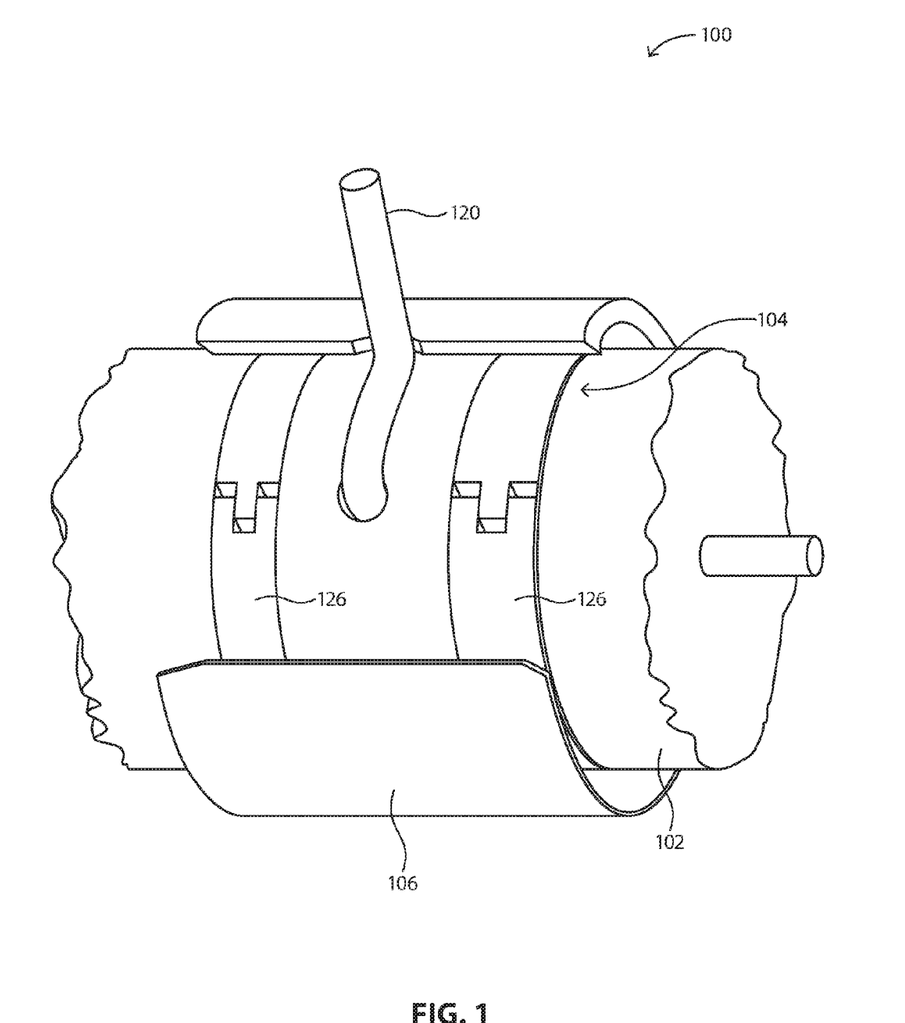
FIG. 1 includes a partially cut away perspective view of an assembly including a first component, a second component, and a seal ring disposed therebetween in accordance with an embodiment.

Referring initially to FIG. 1, an assembly 100 can generally include a first component 102 at least partially disposed within a bore 104 of a second component 106. The first and second components 102 and 106 can be rotationally or reciprocally translatable with respect to one another.

In particular embodiments, the first and second components 102 and 106 can be a shaft and a housing, respectively. While not intended to be limited thereto, one contemplated use for the assembly 100 is for vehicular transmissions, and more particularly to automatic transmissions incorporated into stop-start enabled vehicles whereby the engine is temporarily disengaged when the vehicle is at rest. The shaft may be a drive shaft insertable into a housing or body of the transmission assembly.

An annulus can be formed between the shaft and housing and be provided with one or more lubricious fluids, such as oil, to facilitate relative movement between the shaft and housing. In a particular instance, lubricious fluids can be introduced into the annulus through an opening in the housing, and circulated through the annulus, exiting through an opening in the shaft or through a second opening in the housing.

In certain embodiments, the first and second components 102 and 106 can include, or consist essentially of, different materials with respect to one another. For example, the first component 102 can include a first material and the second component 106 can include a second material different than the first material. In an embodiment, the first material can be less wear resistant than the second material. In another embodiment, the second material can be less wear resistant than the first material. In a particular embodiment, the first material can be a relatively soft metal, such as for example, an aluminum or an aluminum alloy, and the second material can be a relatively hard metal, such as for example, a steel or a steel alloy. In particular embodiments, the seal ring can be keyed to the softer metal to prevent relative movement therewith. Subsequent movement between the seal ring and the harder metal is believed to result in greater wear resistance and longer operational assembly life.

Figure 2:
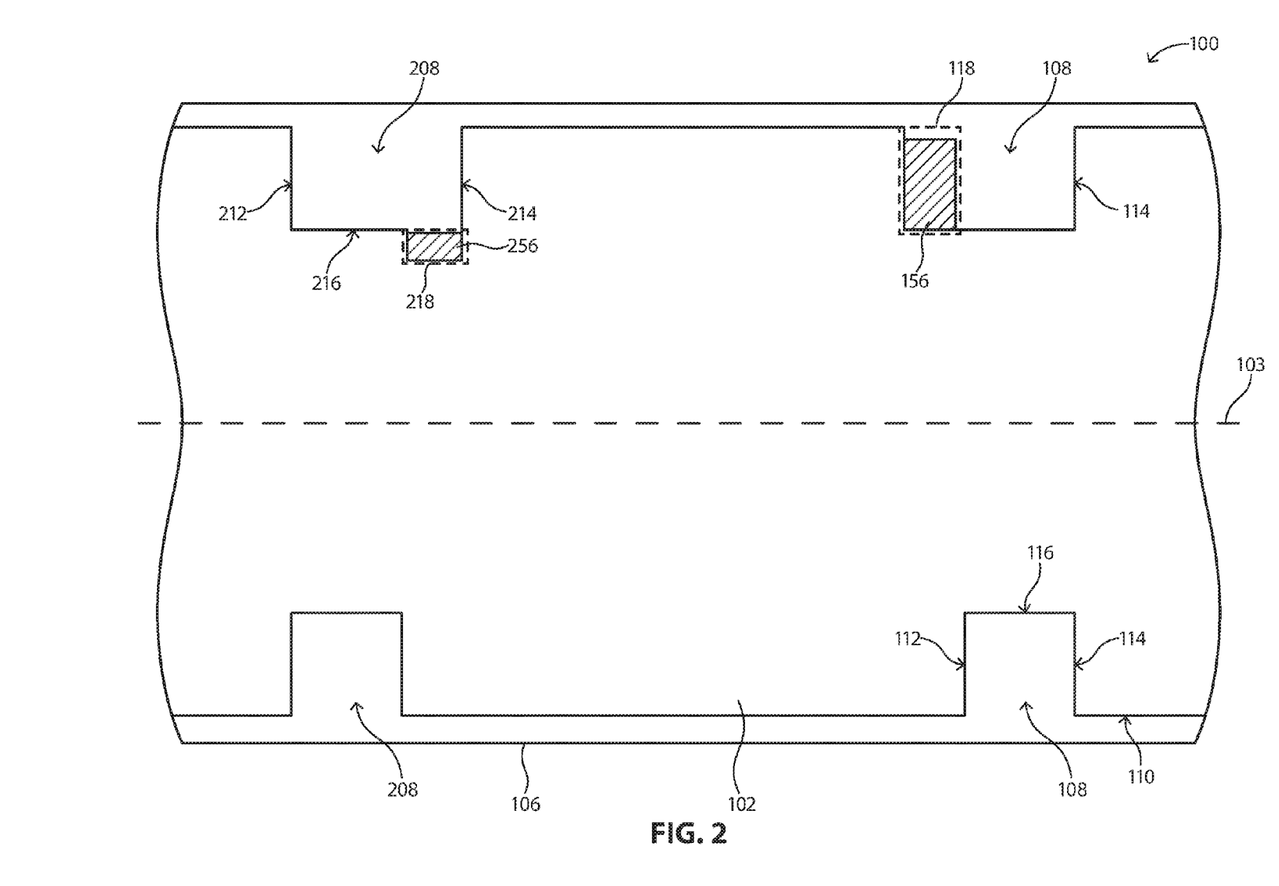
FIG. 2 includes a cross-sectional view of the assembly of FIG. 1 without inclusion of the seal ring in accordance with an embodiment.

FIG. 2 illustrates a cross section of the assembly 100 as seen perpendicular to an axis 103 of the first component 102. The first component 102 can include a groove 108 extending into the first component 102 a distance, as measured from an outer surface 110 of the first component 102. In an embodiment, the groove 108 can extend at least 1 mm into the first component 102, such as at least 2 mm, at least 3 mm, at least 5 mm, or even at least 10 mm. The groove 108 can extend from the surface 110 of the first component 102 no greater than 75% of the radius of the first component 102.

In an embodiment, the groove 108 can circumscribe the entire first component 102. That is, the groove 108 can extend around an entire circumference of the first component 102. In another embodiment, the groove 108 can extend around only a portion of the circumference of the first component 102.

In an embodiment, the groove 108 can have a generally polygonal cross section. For example, the groove 108 can be triangular, quadrilateral, pentagonal, hexagonal, heptagonal, or even octagonal. In a particular embodiment, the groove 108 is quadrilateral. In a more particular embodiment, the groove 108 can be rectangular, including two opposing side surfaces 112 and 114 and a base surface 116 connecting the two opposing side surfaces 112 and 114 together.

In an embodiment, the first component 102 can include a plurality of grooves 108 axially spaced apart from one another. For example, the first component 102 can include at least two grooves, or at least three grooves, or at least four grooves, or at least five grooves, or at least six grooves, or even at least seven grooves. In a particular embodiment, the first component 102 can include no more than one hundred grooves, such as no more than ten grooves.

A notch 118 can extend from the groove 108 into the first component 102. In an embodiment, the notch 118 can be in open communication with the groove 108. The notch 118 can extend in a generally axial direction away from one of the side surfaces 112 and 114 of the groove 108. In a non-illustrated embodiment, the notch 118 can also extend in a generally radial direction away from the base surface 116. In a particular instance, the notch 118 can have a same depth as the groove 108, as measured from the surface 110 of the first component 102. As described in greater detail below, the notch 118 can be adapted to receive a tab 138 extending from a seal ring 126. The notch 118 receives the tab 138 and prevents the seal ring 126 from rotating relative to the first component 102. More particularly, the notch 118 can include opposing circumferential sidewalls 156 (only one sidewall is illustrated in FIG. 2) adapted to secure the tab 128 in the notch 118 and prevent rotation of the seal ring 126 with respect to the first component 102.

In an embodiment, a notch 218 can extend from, and be in open communication with, a second groove 208 in the first component 102. The second groove 208 can extend in a generally radial direction away from a base surface 216 of the groove 208. The notch 218 can also extend in a generally axial direction away from one of the side surfaces 212 or 214 of the groove 208. As illustrated, the notch 218 can have a different depth as compared to the groove 208, as measured from the surface 110 of the first component 102. In a particular embodiment, the notch 218 can have a depth, as measured from the surface 110 of the first component 102, that is greater than the depth of the groove 208. The notch 218 can receive the tab of the seal ring and prevent the seal ring from rotating relative to the first component. More particularly, the notch 218 can include opposing circumferential sidewalls 256 (only one sidewall is illustrated in FIG. 2) adapted to secure the tab 128 in the notch 218 and prevent rotation of the seal ring 126 with respect to the first component 102.

Figure 3:
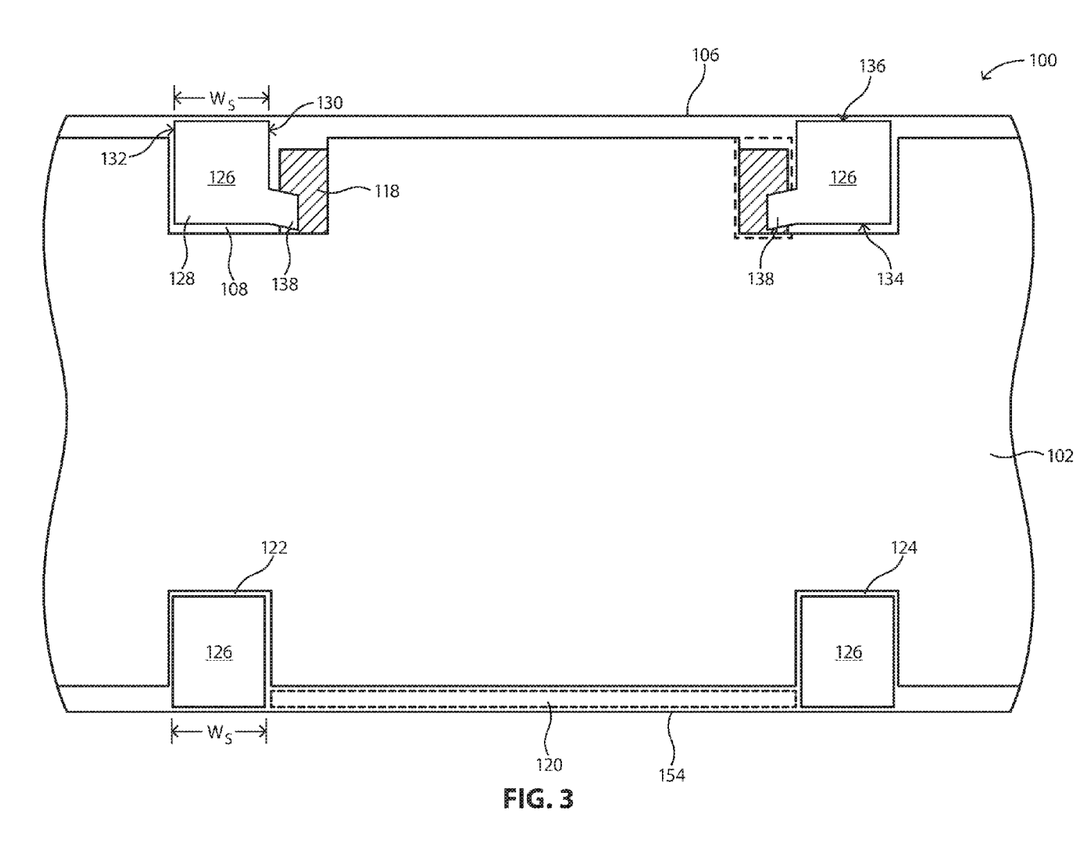
FIG. 3 includes a cross-sectional view of the assembly of FIG. 1 with a seal ring in accordance with an embodiment.
Figure 4:
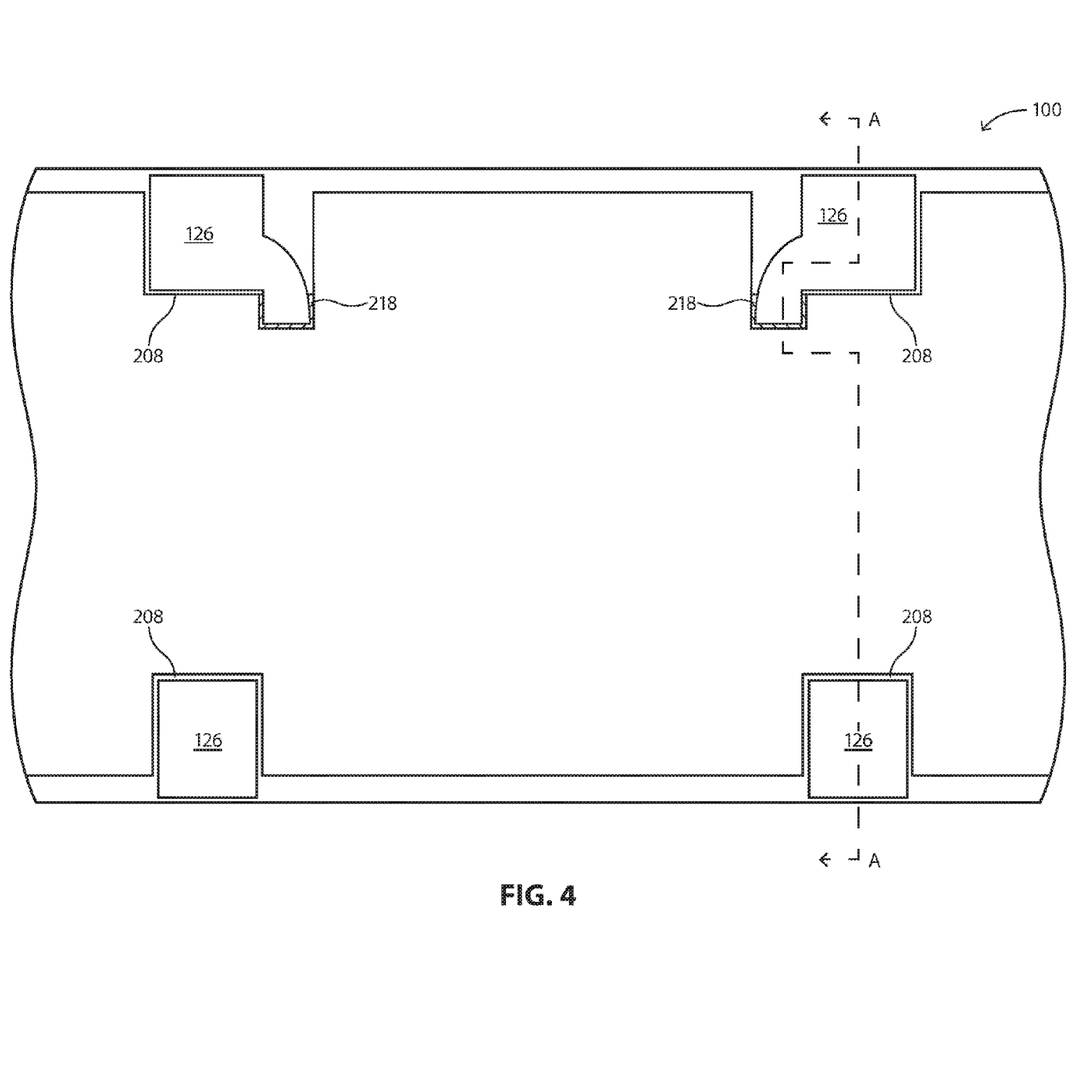
FIG. 4 includes a cross-sectional view of another embodiment of the assembly of FIG. 1 with a seal ring in accordance with an embodiment.

In an embodiment, the system 100 can include a plurality of grooves 108, each groove 108 having one or more notches 118 (FIG. 3). In another embodiment, the system 100 can include a plurality of grooves 208, each groove 208 having one or more notches 218 (FIG. 4). In yet a further embodiment, the system 100 can include a plurality of grooves 108 and 208 and a plurality of notches 118 and 218 extending from the groves 108 and 208, respectively. As illustrated in FIG. 2, the notches 118 and 218 can extend from grooves 108 and 208, respectively, in a direction toward one another. In another embodiment, the notches 118 and 218 can extend away from one another. In yet a further embodiment, the notches 118 and 218 can extend in the same direction as one another.

Referring now to FIG. 3, the lubricious fluid 120 can be disposed or circulated between axially adjacent grooves 122 and 124. Each of the grooves 122 and 124 can receive a seal ring 126 having a generally rectangular cross section. The seal ring 126 can maintain the lubricious fluid 120 within a predefined annular region 154 of the assembly 100. For simplicity, the disclosure describes grooves 108 formed in only the first component 102. It is further contemplated that the second component 106 can include one or more grooves adapted to receive the seal ring 126. In this regard, the system 100 can be inverted such that the seal ring 126 engages with the second component 106 and is rotationally fixed thereto. By way of non-limiting example, this can occur when the second component 106 is formed from a relatively softer material than the first component 102. Keying the seal ring 126 to the second component 106 thus reduces wear thereagainst and prolongs operational system life.

In an embodiment, the seal ring 126 can include a body 128 having a width, $W_S$, as measured between first and second side surfaces 130 and 132, that is less than or equal to the width of the groove 108. The seal ring 126 can further include an inner surface 134 and an outer surface 136. A tab 138 can extend from the body 128 radially inward beyond the inner surface 134 and axially beyond the first side surface 130. The tab 138 can be inserted into the notch 118 of the first component 102 to prevent rotation of the seal ring 126 relative to the first component 102. As illustrated, the tabs 138 of adjacent seal rings 126 can be oriented so as to face one another. In a non-illustrated embodiment, the tabs of adjacent seal rings can be oriented away from one another. In yet another non-illustrated embodiment, the tabs of adjacent seal rings can be oriented in the same direction as one another.

Figure 5:
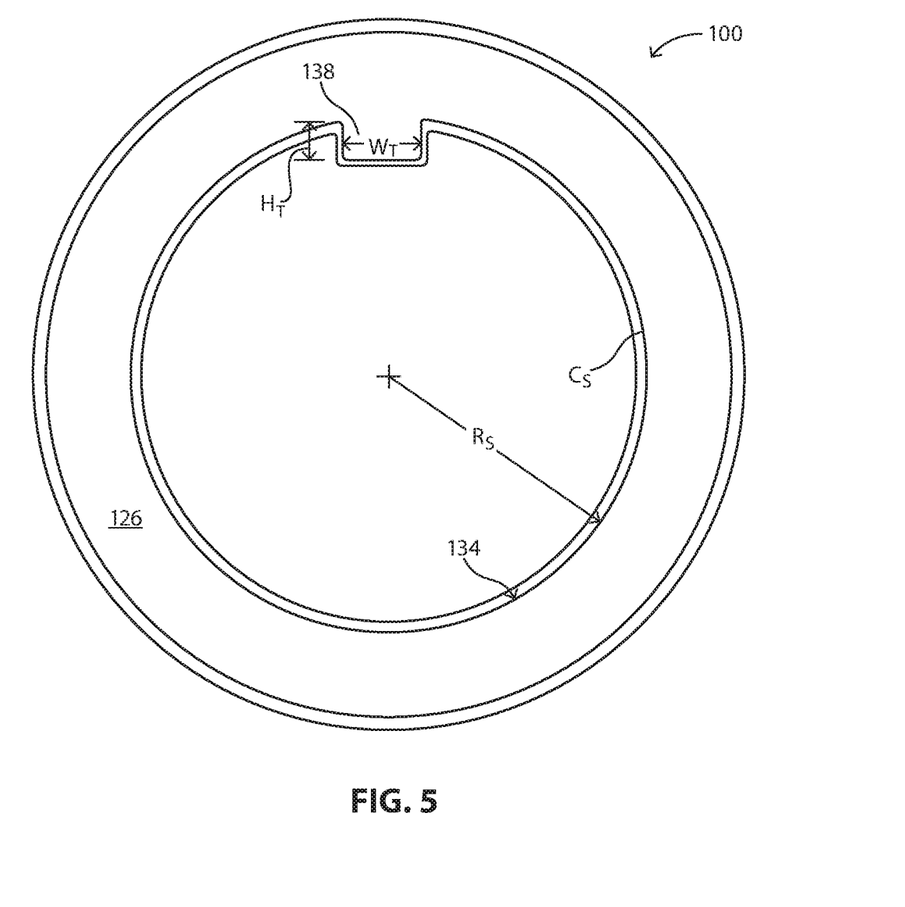
FIG. 5 includes a cross-sectional axial view the assembly of FIG. 4 as seen along Line A-A.

FIG. 5 illustrates a cross-sectional axial view of the assembly 100, including the seal ring 126. As illustrated, the tab 138 has a width, $W_T$, as measured in a circumferential direction of the seal ring 126. In a particular embodiment, $W_T$ is less than a circumference, $C_S$, of the inner surface 134 of the seal ring 126. For example, $C_S/W_T$ can be no greater than 0.9, or no greater than 0.8, or no greater than 0.7, or no greater than 0.6, or no greater than 0.5, or no greater than 0.45, or no greater than 0.4, or no greater than 0.35, or no greater than 0.3, or no greater than 0.35, or no greater than 0.3, or no greater than 0.25, or no greater than 0.2, or no greater than 0.15, or no greater than 0.1, or no greater than 0.05, or even no greater than 0.01. In an embodiment, $C_S/W_T$ is greater than 0.

In an embodiment, the tab 138 can have a maximum radial height, $H_T$, as measured by a maximum distance the tab 138 extends beyond the inner surface 134 of the seal ring 126, that is less than a radius, $R_S$, of the seal ring 126, as measured from a central axis 140 of the seal ring 126 to the inner surface 134. In a particular embodiment, $R_S/H_T$ can be no greater than 0.75, or no greater than 0.5, or no greater than 0.25, or no greater than 0.2, or no greater than 0.15, or no greater than 0.1, or no greater than 0.05, or even no greater than 0.01. In another particular embodiment, $R_S/H_T$ is greater than 0. While seal rings 126 with large $R_S/H_T$ ratios can have enhanced engagement relative to the first component 102, assembly thereof can require greater material flexing to align and insert the tab 138 into the notch 118.

In an embodiment, the tab 138 can be monolithic with the body 128 of the seal ring 126. In another embodiment, the tab 138 can include one or more discrete components coupled to the body 128, for example, by an adhesive, a threaded or non-threaded fastener, mechanical crimping, or any other suitable method.

In certain embodiments, such as for example, those illustrated in FIGS. 6A-6F, the tab 138 can extend from only one of the surfaces 130, 132, 134, or 136 of the body 128. That is, fixed attachment of the tab 138 to the body 128 can occur along only one of the surfaces 130, 132, 134, or 136. In a particular embodiment, the tab 138 can extend only from the first side surface 130. In another particular embodiment, the tab 138 can extend only from the inner surface 134.

In other embodiments, such as for example, those illustrated in FIGS. 6G-6L, the tab 138 extends from at least two surfaces 130, 132, 134, and 136 of the body 128. In a particular embodiment, the tab 138 extends from both the first side surface 130 and the inner surface 134.

Figure 6A:
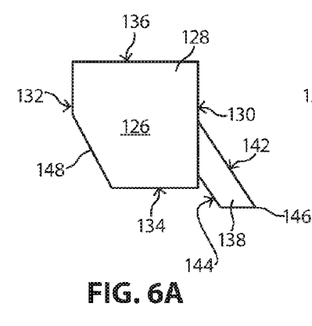
FIGS. 6A-6L each include a cross-sectional side elevation view of tab profile in accordance with an embodiment.
Figures 6B, 6C:
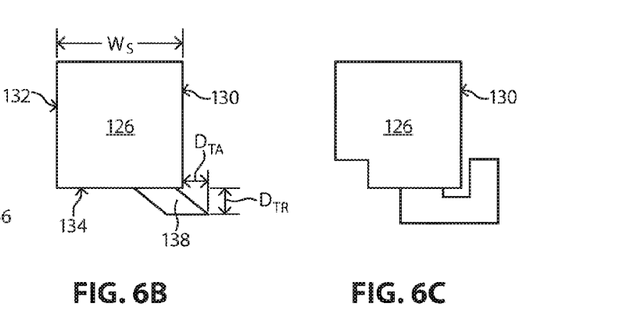
Figure 6D:
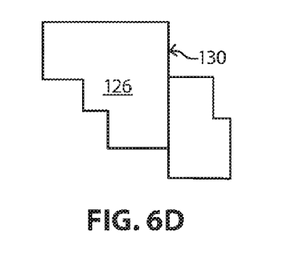

In an embodiment, such as illustrated in FIG. 6B, the tab 138 extends beyond the first side surface 130 by a distance, $D_{TA}$, that is less than a width, $W_S$, of the seal ring 126, as measured between the first side surface 130 and the second side surface 132. In an embodiment $D_{TA}$ is less than 0.99 $W_S$, such as less than 0.95 $W_S$, less than 0.9 $W_S$, less than 0.85 $W_S$, less than 0.8 $W_S$, less than 0.75 $W_S$, less than 0.7 $W_S$, less than 0.65 $W_S$, less than 0.6 $W_S$, less than 0.55 $W_S$, less than 0.5 $W_S$, less than 0.45 $W_S$, less than 0.4 $W_S$, less than 0.35 $W_S$, less than 0.3 $W_S$, less than 0.25 $W_S$, less than 0.2 $W_S$, less than 0.15 $W_S$, less than 0.1 $W_S$, or even less than 0.05 Ws. In an embodiment, $D_{TA}$ is at least 0.01 $W_S$.

In an embodiment, $D_{TA}$ can be different than a distance, $D_{TR}$, that the tab 138 extends radially beyond the inner surface 134. That is, the tab 138 can extend an axial distance, $D_{TA}$, and a radial distance, $D_{TR}$, where the axial and radial distances, $D_{TA}$ and $D_{TR}$, respectively, are different from one another. In a particular embodiment, the axial distance, $D_{TA}$, is greater than the radial distance, $D_{TR}$. In another particular embodiment, the radial distance, $D_{TR}$, is greater than the axial distance, $D_{TA}$. By way of a non-limiting example, ratios of $D_{TR}:D_{TA}$ can be in a range of 0.01:1 to 1:0.01.

In an embodiment the tab 138 does not extend axially beyond the second side surface 132. In yet a further embodiment, the tab 138 does not extend radially beyond the outer surface 136.

Figure 6E:
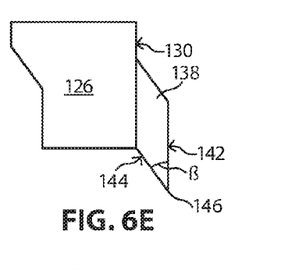
Figure 6F:
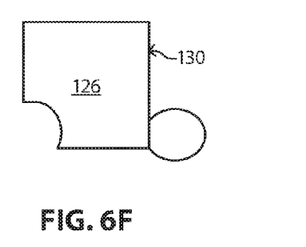
Figures 6G, 6H:
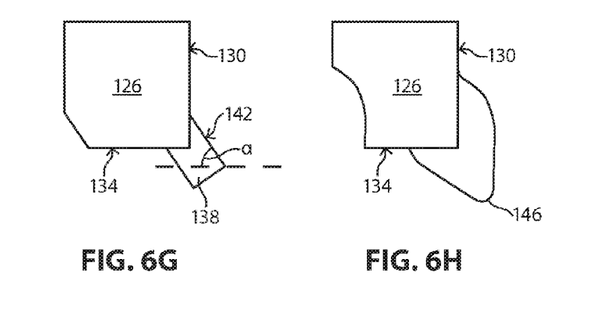
Figure 6I:
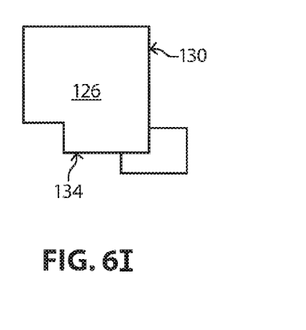
Figure 6J:
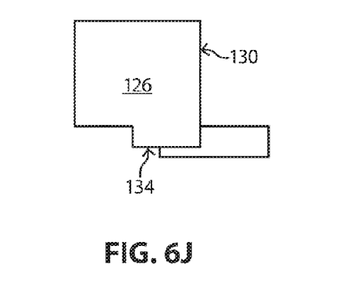
Figure 6K:
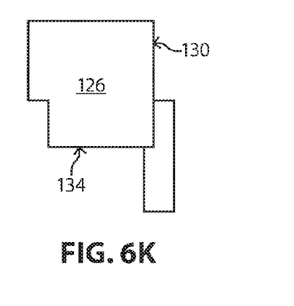
Figure 6L:
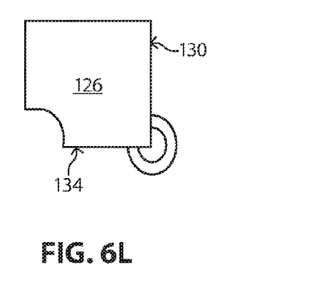

In a particular embodiment, such as for example, as illustrated in FIG. 6G, the tab 138 can include a major surface 142. By way of a non-limiting embodiment, the major surface 142 can be planar or arcuate. In an embodiment, the major surface 142 can be similar in shape to the shape of the notch 118 in the first component 102. That is, seal rings 126 being used with planar notches 118 can include planar major surfaces 142. Similarly, seal rings 126 being used with arcuate notches 118 or notches 118 having non-linear profiles can include arcuate, or otherwise non-linear, profiled major surfaces 142.

In an embodiment, the major surface 142 can be canted relative to a central axis of the seal ring 116, forming a relative angle, a, therebetween of at least 0.5°, such as at least 1°, at least 2°, at least 3°, at least 4°, at least 5°, at least 10°, at least 15°, at least 20°, at least 25°, at least 30°, at least 35°, at least 40°, or even at least 45°. Such canting can facilitate easier insertion of the tab 138 into the notch 118.

Referring now, for example, to FIG. 6E, the tab 138 can further include a tip 146 representing the innermost point relative to the central axis 140. The tip 146 can be formed by a junction of the major surface 142 and a second major surface 144. The tip 146 can define a relative angle, β, of at least 1°, such as at least 2°, at least 3°, at least 4°, at least 5°, at least 10°, at least 15°, or even at least 20°. In an embodiment, the angle, β, is no greater than 75°, such as no greater than 70°, no greater than 65°, no greater than 60°, no greater than 55°, no greater than 50°, no greater than 45°, no greater than 40°, no greater than 35°, no greater than 30°, or even no greater than 25°. In a particular instance, the tip 146 can be at least partially arcuate, or generally rounded (e.g., FIG. 6H). The tip 146 can have a radius of curvature of at least 0.5 mm, such as at least 1 mm, or even at least 2 mm. This can permit easier installation of the tab 138 within the notch 118. In another particular instance, the tip 146 can be sharp, i.e., the intersection of two planes (e.g., FIG. 6E). In certain embodiments, the tip 146 can be uniform along an entire circumferential width, $W_T$, of the tab 138. In other embodiments, the tip 146 can have a varying profile. For example, by way of a non-limiting example, edge portions of the tip 146 (i.e., those portions of the tip 146 near the circumferential edges of the tab 138) can be rounded while the middle portion of the tip 146 can be sharp. In these and other embodiments, the tab 138 can have a triangular cross section, which can more easily install within the notch 118 as compared to a rectangular tab 138.

In certain embodiments, such as illustrated for example in FIG. 6A, the seal ring 126 can further include a relief portion 148 adapted to receive and accommodate a tab of a different seal ring. That is, the relief portion 148 can permit stacking of seal rings 126 having tabs 138 extending beyond the first side surface 140.

Figure 7:
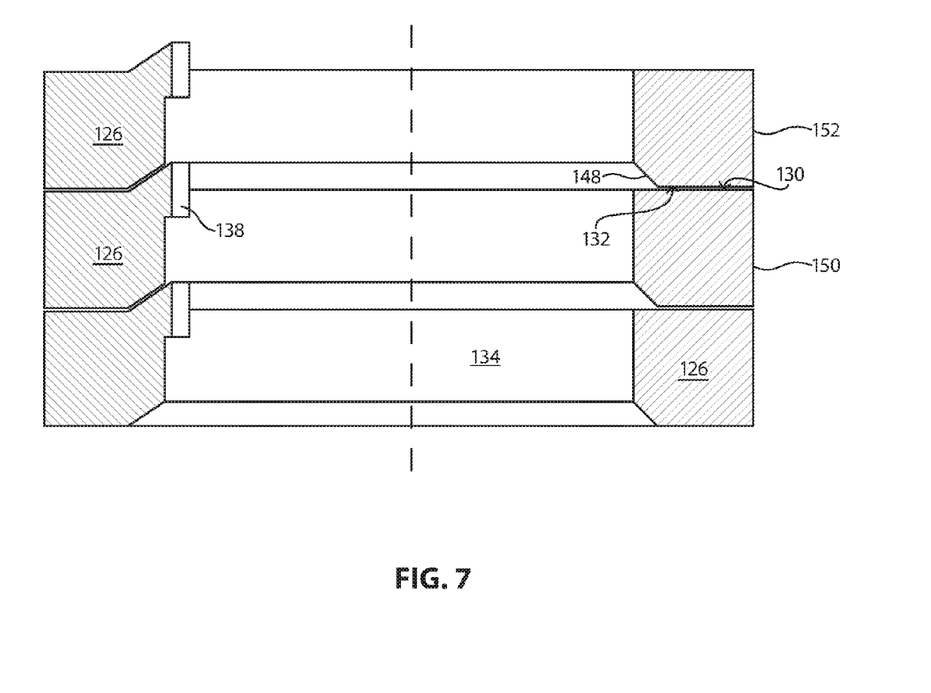
FIG. 7 includes a cross-sectional elevation view of a plurality of stacked seal rings in accordance with an embodiment.

FIG. 7 illustrates a cross-sectional elevation view of a plurality of stacked seal rings 126. Spacing between adjacent seal rings 126 is illustrated for the purpose of showing seal ring surfaces. Skilled artisans will appreciate that the spacing may not exist in actual usage. As illustrated, the tab 138 of a first seal ring 150 can radially overlap a portion of a second seal ring 152 disposed adjacent to the first seal ring 150. The tab 138 of the first seal ring 150 can rest within a space created by the relief portion 148 of the second seal ring 152, thereby permitting the first side surface 130 of the first seal ring 150 to directly contact the second side surface 132 of the second seal ring 152. This arrangement can permit usage of tabs extending both axially and radially inward, allowing both stacking of seal rings and engagement of those seal rings with a first component.

Referring again to FIG. 6A, the relief portion 148 can include a chamfered surface extending between the inner surface 134 and the second side surface 132 of the body 128. The chamfered surface can extend around an entire circumference of the seal ring 126 (e.g., FIG. 7). In an embodiment, the chamfered surface can be planar so as to form a frustoconical surface (e.g., FIG. 6A). In another embodiment, the chamfered surface can include a stepped configured including at least two discrete steps (e.g., FIG. 6D). In yet another embodiment, the chamfered surface can be arcuate or otherwise non-linear (e.g., FIG. 6F). In accordance with at least one embodiment, the relief portion 148 profile can be generally similar to the tab profile (e.g., FIGS. 6A and 6C to 6L). That is, the relief portion 148 can be shaped to have a same geometric cross-sectional profile as the surface of the tab 138.

As described above, the relief portion 148 can extend uniformly around an entire circumference of the body 128 (FIG. 7). However, the disclosure is not intended to be limited only to those uniformly extending relief portions 148. In another embodiment, the relief portion can include a notch formed in the body of the seal ring. The notch can have a shape and size generally similar to the shape and size of the tab. Particularly, the notch can define a concavity in the body having a shape generally similar to a shape of the tab. That is, unlike the previously described embodiment, the relief portion here can prevent relative rotation of adjacent stacked seal rings. In a more particular embodiment, the notch can be axially aligned with the tab. That is, the notch can extend into the body at a same circumferential position as compared to the tab, but along the second side surface. This can permit the tabs of adjacent seal rings to align with one another when positioned in a stacked configuration.

One or more hydrostatic relief pockets (not illustrated) can be disposed along one or more of the surfaces 130, 132, 134, or 136 to enhance fluidic sealing of the assembly under operating conditions. Upon an increase in pressure, the hydrostatic relief pocket can generate a hydrostatic pressure, thereby urging the seal ring 126 into a suitable sealing position.

In a non-illustrated embodiment, the seal ring 126 can include a second tab. In yet another non-illustrated embodiment, the seal ring 126 can include more than two tabs. That is, the seal ring 126 can include at least three tabs, at least four tabs, or even at least five tabs. The tabs can be disposed around the circumference of the seal ring 126. In an embodiment, the tabs can have a same size or shape as compared to one another. In another embodiment, the tabs can have a different size or shape as compared to one another. The tabs can be equally spaced apart around the seal ring 126 in a circumferential direction. Alternatively, the tabs can be staggered at uneven intervals around the seal ring 126. As will be appreciated after reading the entire specification, the staggering of tabs around the seal ring 126 should be at intervals equal to staggering of notches 118 in the first component 102. That is, the tabs should be staggered so as to align with the notches 118 of the first component 102.

The seal ring 126 can include any suitable material adapted to form a fluidic seal between components. As seal rings are known in the art, a comprehensive listing of materials is not provided. While not intended to be limited thereto, the seal ring 126 can include, for example, a polytetrafluoroethylene (PTFE), a polyether ether ketone (PEEK), a polyimide (PI), or a polyamide-imide (PAI). Fluoropolymers and other similar materials having low coefficients of friction are particularly well suited for those applications where the seal ring 126 is compressed in a radial direction and provides a radial biasing force between components. The seal ring 126 can be formed by any suitable manufacturing process or combination of manufacturing processes, including, for example, injection molding, extruding, machining, forging, or other similar process.

The seal ring 126 can be adapted to operate at temperatures of at least 100° C., such as at least 125° C., at least 150° C., at least 175° C., at least 200° C., at least 225° C., at least 250° C., at least 275° C., or even at least 300° C. Maximum operating temperatures can be less than 400° C., such as less than 375° C., less than 350° C., or even less than 325° C.

Figure 8:
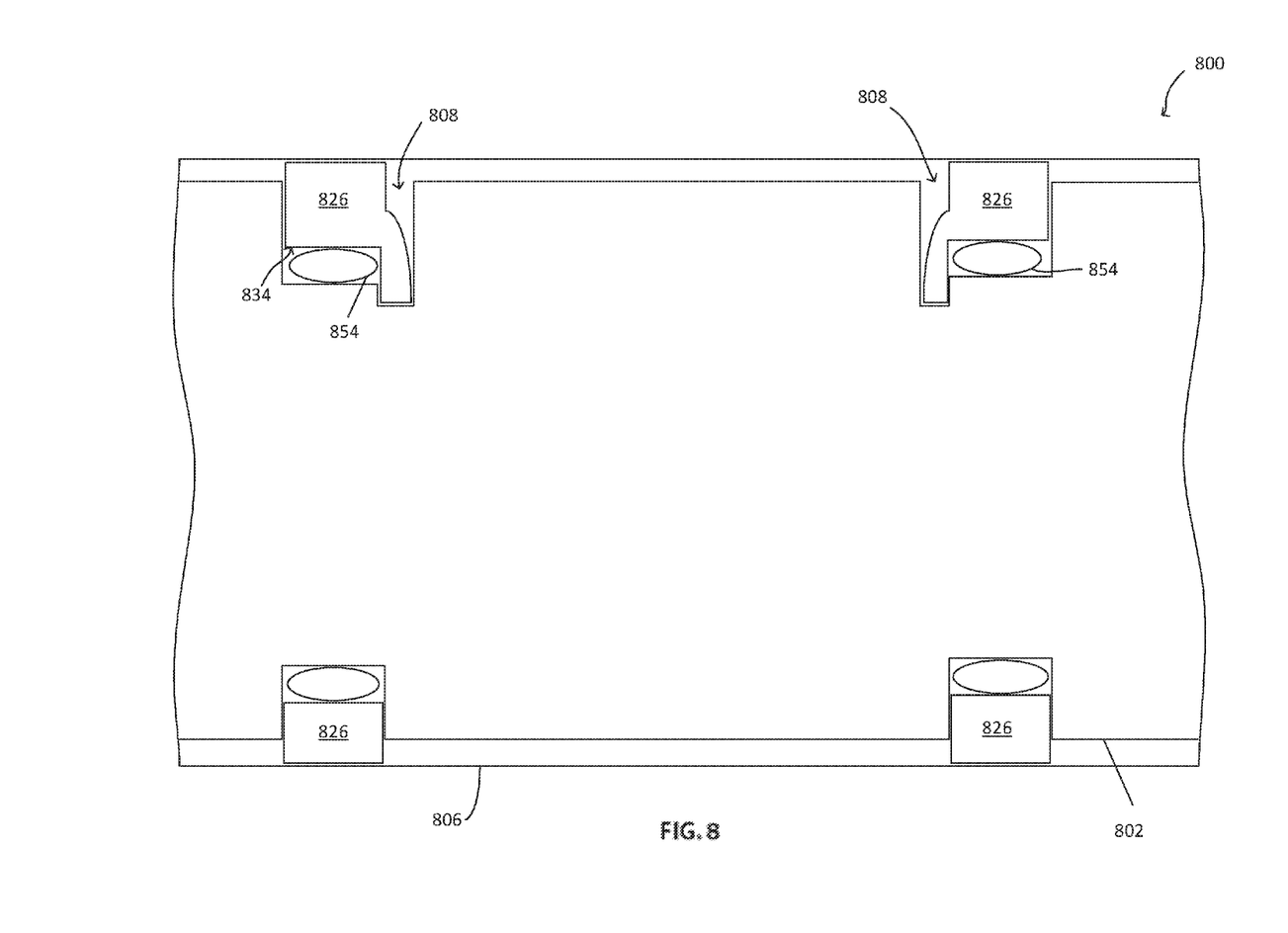
FIG. 8 includes a cross-sectional elevation view of an assembly in accordance with an embodiment.

Referring to FIG. 8, an assembly 800 in accordance with an embodiment can include a seal ring 826 disposed between a first component 802 and a second component 806, and an annular member 854 disposed between the seal ring 826 and the first component 802. The assembly 800 can include any number of similar features or characteristics as described above with respect to assembly 100. For example, the first component 802 can include a groove 808 into which at least a portion of the seal ring 826 is insertable.

In an embodiment, the entire annular member 854 and at least a portion of the seal ring 826 can be disposed within the groove 808. In another embodiment, the annular member 854 can be disposed only partially within the groove 808. That is, a portion of the annular member 854 can extend from the groove 808. To accommodate the width of the annular member 854, the groove 808 can be made to extend deeper into the first component 802, the seal ring 826 can be made to have a smaller radial height, or a combination thereof.

By way of a non-limiting example, any combination of features including dimples, ridges, and troughs can extend around at least a portion of the annular member 854. These features can prevent relative movement between the annular member 854 and the seal ring 826. This, in turn, can facilitate an improved sealing characteristic within the assembly 800.

In an embodiment, the annular member 854 can be disposed adjacent to an inner surface 834 of the seal ring 826. More particularly, the annular member 854 can be immediately adjacent to the inner surface 834. In a more particular embodiment, the annular member 854 can contact the inner surface 834. In another more particular embodiment, one or more layers or materials can be disposed between the annular member 854 and the inner surface 834 of the seal ring 826.

In certain embodiments, the annular member 854 can extend around at least 1% of a circumference of the groove 808, at least 5% of the circumference, at least 10% of the circumference, at least 25% of the circumference, at least 50% of the circumference, at least 75% of the circumference, or at least 99% of the circumference. In an embodiment, the annular member 854 can extend around the entire circumference of the groove. That is, the annular member can extend continuously around the assembly 800.

The annular member 854 can have an initial radial height, as measured prior to installation within the assembly 800, and an assembled radial height, as measured after installation, where the initial radial height is greater than the assembled radial height. For example, in an embodiment, the initial radial height can be at least 101% the assembled radial height, at least 102% the assembled radial height, at least 103% the assembled radial height, at least 104% the assembled radial height, at least 105% the assembled radial height, at least 110% the assembled radial height, at least 120% the assembled radial height, at least 130% the assembled radial height, at least 140% the assembled radial height, or at least 1150% the assembled radial height.

In a particular instance, the annular member 854 can operate in a state of compression between the seal ring 826 and first component 802. In an embodiment, the annular member 854 can be adapted to bias the seal ring 826 in a radially outward direction. In a particular embodiment, the annular member 854 can increase seal effectiveness within the assembly 800.

In certain embodiments, the annular member 854 can provide an inwardly or outwardly biasing force against the seal ring 826, as measured installed within the assembly 800, of at least 0.0001 N/mm$^2$, at least 0.001 N/mm$^2$, at least 0.01 N/mm$^2$, at least 0.1 N/mm$^2$, at least 0.5 N/mm$^2$, at least 1 N/mm$^2$, at least 2 N/mm$^2$, at least 3 N/mm$^2$, at least 4 N/mm$^2$, at least 5 N/mm$^2$, at least 10 N/mm$^2$, or even at least 25 N/mm$^2$. In a particular embodiment, the annular member 854 can provide an inwardly biasing force against the seal ring 826, as measured installed within the assembly 800, of no greater than 200 N/mm$^2$, or no greater than 100 N/mm$^2$. In certain embodiments, the annular member 854 may not provide an inwardly or outwardly biasing force against the seal ring 826 under at least one operating condition. For example, by way of a non-limiting example and in accordance with a particular embodiment, the annular member 854 may not bias the seal ring 826 when the first and second components 802 and 806 are static relative to one another and maintained at a particular operating temperature.

In an embodiment, the annular member 854 can have a cross-sectional shape selected from at least one of: a polygon, a rectangle, a square, an ellipsoid, an oval, or a circle. In an embodiment, the annular member 854 can have a width that is different than a seal width, $W_S$, of the seal ring 826. In a more particular embodiment, the annular member 854 can have a width greater than $W_S$. For example, the width of the annular member 854 can be at least 1.01 $W_S$, at least 1.05 $W_S$, at least 1.1 $W_S$, or at least 1.25 $W_S$. In another more particular embodiment, the annular member 854 can have a width less than $W_S$. For example, the width of the annular member 854 can be less than 0.99 $W_S$, less than 0.95 $W_S$, less than 0.9 $W_S$, or less than 0.75 $W_S$.

In yet another embodiment, the annular member 854 can have a width that is equal to the seal width, $W_S$, of the seal ring 826.

In a particular instance, the annular member 854 can include, consist essentially of, or be formed from a same material as the seal ring 826. In another particular instance, the annular member 854 can include, consist essentially of, or be formed from a polymer, such as, for example, a PTFE, a PEEK, a PI, or a PAI. In yet another instance, the annular member 854 can include, consist essentially of, or be formed from a metal or an alloy, such as a steel-containing material, an aluminum-containing material, a zinc-containing material, a copper-containing material, a magnesium-containing material, another suitable metallic material, or combination thereof. In a particular, non-limiting embodiment, the annular member 854 can comprise brass.

In an embodiment, the annular member 854 can have a Modulus of Elasticity of at least 0.01 GPa, at least 0.1 GPa, at least 1 GPa, at least 10 GPa, at least 100 GPa, or at least 200 GPa. In another embodiment, the Modulus of Elasticity may be no greater than 500 GPa. In a particular embodiment, the annular member 854 can have a Modulus of Elasticity in a range between and including 0.1 GPa and 300 GPa. In certain embodiments, the assembly 800 can have greater seal effectiveness, as measured by the relative ability to withstand leakage over a predefined amount of time, with use of the annular member 854 as compared to an assembly omitting use of the annular member. That is, the assembly 800 can be rated for use at higher operating pressures and conditions with inclusion of the annular member 854. For example, the seal effectiveness can be at least 1% greater with inclusion of the annular member 854, at least 2% greater, at least 3% greater, at least 4% greater, at least 5% greater, at least 10% greater, at least 25% greater, or at least 50% greater. It is believed that the radially outward biasing force provided by the annular member 854 against the inner surface 834 of the seal ring 826 can facilitate such improved performance.

In an embodiment, the annular member 854 can be at least partially installed relative to the seal ring 826 prior to installation with the first and second components 802 and 806. The combination of the seal ring 826 and annular member 854 can then be installed with the first or second components 802 or 806. In another embodiment, one of the annular member 854 and seal ring 826 can first be installed relative to the first component 802 or second component 806 prior to engagement of the other of the annular member 854 and seal ring 826. Lubrication such as grease can be used during installation to facilitate easier assembly and installation.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Embodiment 1

A seal ring comprising:
a body having an inner surface, an outer surface, and a first side surface; and
a tab extending from the body and adapted to prevent rotation of the seal ring relative to a component receiving the tab, wherein the tab extends radially inward beyond the inner surface and axially beyond the first side surface.

Embodiment 2

A seal ring comprising:
a body having an inner surface, an outer surface, and a first side surface; and
a tab adapted to engage with a notch in a first component, wherein the seal ring comprises a relief portion adapted to accommodate a tab of a different seal ring.

Embodiment 3

An assembly comprising:
a first component;

a second component; and
a seal ring disposed between the first component and the second component;
wherein the seal ring comprise a body having an inner surface, an outer surface, and a first side surface, wherein the seal ring comprises a tab extending radially inward beyond the inner surface and axially beyond the first side surface,
wherein the first component comprises a notch adapted to receive the tab thereby locking the seal ring from rotational movement in relation to the first component.

Embodiment 4

A plurality of stacked seal rings, wherein as viewed perpendicular to a central axis of the plurality of stacked seal rings, a tab of a first of the plurality of stacked seal rings radially overlaps a portion of a second of the plurality of stacked seal rings, wherein the first seal ring is adjacent the second seal ring in the plurality of stacked seal rings.

Embodiment 5

A plurality of stacked seal rings, wherein each of the plurality of stacked seal rings comprises:
a body having an inner surface, an outer surface, a first side surface, and a second side surface generally opposite the first side surface;
a tab extending radially inward beyond the inner surface and axially beyond the first side surface; and
a relief portion adapted to accommodate a tab of an adjacent sealing ring such that the first side surface of a seal ring directly contacts the second side surface of the adjacent seal ring.

Embodiment 6

The seal ring, assembly, or plurality of stacked seal rings of any one of the preceding items, wherein each seal ring comprises a:
body having an inner surface, an outer surface, a first side surface, and a second side surface generally opposite the first side surface;
a tab extending radially inward beyond the inner surface and axially beyond the first side surface; and
a relief portion adapted to accommodate a tab of an adjacent sealing ring such that the first side surface of a seal ring directly contacts the second side surface of the adjacent seal ring,
wherein the tab is disposed at a first circumferential position on the body, wherein the relief portion is disposed at second circumferential position on the body, and wherein the first and second circumferential positions are axially adjacent one another.

Embodiment 7

The seal ring, assembly, or plurality of stacked seal rings of any one of items 2, 5 and 6, wherein the tab is axially aligned with the relief portion.

Embodiment 8

The seal ring, assembly, or plurality of stacked seal rings of any one of items 1-3 and 5-7, wherein the tab extends at least partially from the first side surface, and wherein the relief portion is recessed at least partially into the second side surface.

Embodiment 9

The plurality of stacked seal rings of any one of items 5-8, wherein the relief portion defines a concavity in the body, and wherein the concavity has a shape generally similar to a shape of the tab.

Embodiment 10

The plurality of stacked seal rings of any one of items 5-8, wherein the relief portion comprises a chamfered surface.

Embodiment 11

The plurality of stacked seal rings of item 10, wherein the chamfered surface extends between the inner surface and the second side surface of the body.

Embodiment 12

The plurality of stacked seal rings of any one of the preceding items, wherein the relief portion extends uniformly around an entire circumference of the body.

Embodiment 13

The seal ring, assembly, or plurality of stacked seal rings of any one of the preceding items, wherein the body of the seal ring comprises a seal width, $W_S$, as measured between a first side surface and a second side surface of the body, wherein the tab extends beyond the first side surface a distance, $D_{TA}$, and wherein $D_{TA}$ is less than $W_S$, such as wherein $D_{TA}$ is less than 0.99 $W_S$, less than 0.95 $W_S$, less than 0.9 $W_S$, less than 0.85 $W_S$, less than 0.8 $W_S$, less than 0.75 $W_S$, less than 0.7 $W_S$, less than 0.65 $W_S$, less than 0.6 $W_S$, less than 0.55 $W_S$, less than 0.5 $W_S$, less than 0.45 $W_S$, less than 0.4 $W_S$, less than 0.35 $W_S$, less than 0.3 $W_S$, less than 0.25 $W_S$, less than 0.2 $W_S$, less than 0.15 $W_S$, less than 0.1 $W_S$, or even less than 0.05 $W_S$.

Embodiment 14

The seal ring, assembly, or plurality of stacked seal rings of any one of the preceding items, wherein the tab extends at least partially from the first side surface, at least partially from the inner surface, at least partially from the outer surface, or from a combination of surfaces.

Embodiment 15

The seal ring, assembly, or plurality of stacked seal rings of any one of the preceding items, wherein the tab extends from the body at least partially in an axial direction and at least partially in a radial direction.

Embodiment 16

The seal ring, assembly, or plurality of stacked seal rings of item 15, wherein the tab extends a maximum distance in the axial direction and a maximum distance in the radial direction, and wherein the maximum distance in the axial direction is different than the maximum distance in the radial direction.

Embodiment 17

The seal ring, assembly, or plurality of stacked seal rings of any one of items 15 and 16, wherein the tab extends a maximum distance in the axial direction and a maximum distance in the radial direction, and wherein the maximum distance in the axial direction is greater than the maximum distance in the radial direction.

Embodiment 18

The seal ring, assembly, or plurality of stacked seal rings of any one of items 15 and 16, wherein the tab extends a maximum distance in the axial direction and a maximum distance in the radial direction, and wherein the maximum distance in the axial direction is less than the maximum distance in the radial direction.

Embodiment 19

The seal ring, assembly, or plurality of stacked seal rings of any one of the preceding items, wherein the tab extends a maximum distance in the axial direction, wherein the tab extends a maximum distance beyond the first side surface, and wherein the maximum distance in the axial direction is less than the maximum distance beyond the first side surface.

Embodiment 20

The seal ring, assembly, or plurality of stacked seal rings of any one of the preceding items, wherein the tab extends a maximum distance in the radial direction, wherein the tab extends a maximum distance beyond the inner surface, and wherein the maximum distance in the radial direction is less than the maximum distance beyond the inner surface.

Embodiment 21

The seal ring, assembly, or plurality of stacked seal rings of any one of the preceding items, wherein the tab is monolithic with the body.

Embodiment 22

The seal ring, assembly, or plurality of stacked seal rings of any one of the preceding items, wherein the tab has a width, $W_T$, as measured in a circumferential direction of the seal ring, wherein the seal ring has a circumference, $C_S$, and wherein $C_S/W_T$ is no greater than 0.5, such as no greater than 0.45, no greater than 0.4, no greater than 0.35, no greater than 0.3, no greater than 0.25, no greater than 0.2, no greater than 0.15, no greater than 0.1, no greater than 0.05, or even no greater than 0.01.

Embodiment 23

The seal ring, assembly, or plurality of stacked seal rings of any one of the preceding items, wherein the tab has a width, $W_T$, as measured in a circumferential direction of the seal ring, wherein the seal ring has a circumference, $C_S$, and wherein $C_S/W_T$ is greater than 0.

Embodiment 24

The seal ring, assembly, or plurality of stacked seal rings of any one of the preceding items, wherein the tab has a maximum radial height, $H_T$, as measured by a maximum dimension of the tab in a radial direction, wherein the body has an inner radius, $R_S$, and wherein $R_S/H_T$ is no greater than 0.75, such as no greater than 0.5, no greater than 0.25, no greater than 0.2, no greater than 0.15, no greater than 0.1, no greater than 0.5, or even no greater than 0.1.

Embodiment 25

The seal ring, assembly, or plurality of stacked seal rings of any one of the preceding items, wherein the tab has a maximum radial height, $H_T$, as measured by a maximum dimension of the tab in a radial direction, wherein the body has an inner radius, $R_S$, and wherein $R_S/H_T$ is greater than 0.

Embodiment 26

The seal ring, assembly, or plurality of stacked seal rings of any one of the preceding items, wherein the body further comprises a second side surface generally opposite the first side surface, and wherein the tab does not extend axially beyond the second side surface.

Embodiment 27

The seal ring, assembly, or plurality of stacked seal rings of any one of the preceding items, wherein the tab is canted relative to a central axis of the seal ring.

Embodiment 28

The seal ring, assembly, or plurality of stacked seal rings of any one of the preceding items, wherein the tab has a planar surface.

Embodiment 29

The seal ring, assembly, or plurality of stacked seal rings of any one of the preceding items, wherein the tab has a generally polygonal cross section.

Embodiment 30

The seal ring, assembly, or plurality of stacked seal rings of any one of the preceding items, wherein the tab defines a tip, and wherein the tip is a junction between at least two surfaces of the tab.

Embodiment 31

The seal ring, assembly, or plurality of stacked seal rings of item 30, wherein the tip is at least partially arcuate.

Embodiment 32

The seal ring, assembly, or plurality of stacked seal rings of any one of the preceding items, wherein the seal ring further comprises:
a second tab.

Embodiment 33

The seal ring, assembly, or plurality of stacked seal rings of item 32, wherein the second tab extends radially inward beyond the inner surface and axially beyond the first side surface.

Embodiment 34

The seal ring, assembly, or plurality of stacked seal rings of any one of items 32 and 33, wherein the second tab is adapted to engage with a complimentary groove in a first component, wherein the seal ring comprises a relief portion adapted to accommodate a second tab of a different seal ring.

Embodiment 35

The seal ring, assembly, or plurality of stacked seal rings of any one of items 32-34, wherein the second tab extends from the body of the seal ring and is circumferentially spaced apart from the tab.

Embodiment 36

The seal ring, assembly, or plurality of stacked seal rings of any one of the preceding items, wherein the seal ring has a generally polygonal cross section.

Embodiment 37

The seal ring, assembly, or plurality of stacked seal rings of any one of the preceding items, wherein the seal ring is adapted to operate at temperatures of at least 150° C., such as at least 200° C., at least 225° C., at least 250° C., at least 275° C., or even at least 300° C.

Embodiment 38

The seal ring, assembly, or plurality of stacked seal rings of any one of the preceding items, wherein the seal ring comprises a polymer, such as a PTFE, a PEEK, PI, or a PAI.

Embodiment 39

The seal ring, assembly, or plurality of stacked seal rings of any one of the preceding items, wherein the seal ring is adapted to engage a first component of a first material on the inner surface and a second component of a second material on the outer surface, and wherein the first and second materials are different from one another.

Embodiment 40

The seal ring, assembly, or plurality of stacked seal rings of item 39, wherein the first material is less wear resistant than the second material.

Embodiment 41

The seal ring, assembly, or plurality of stacked seal rings of item 39, wherein the second material is less wear resistant than the first material.

Embodiment 42

The seal ring, assembly, or plurality of seal rings of any one of the preceding items, wherein the seal ring is injection molded.

Embodiment 43

The seal ring, assembly, or plurality of seal rings of any one of the preceding items, wherein the seal ring is adapted to engage a first component and a second component, the first and second components being rotatable with respect to one another, and wherein the first component comprises a groove adapted to receive at least a portion of the tab.

Embodiment 44

The seal ring, assembly, or plurality of seal rings of item 43, wherein the groove has a shape generally similar to a shape of the tab.

Embodiment 45

The seal ring, assembly, or plurality of seal rings of any one of the preceding items, wherein the tab has a triangular cross section.

Embodiment 46

The seal ring, assembly, or plurality of seal rings of any one of the preceding items, wherein the tab comprises a first surface angularly offset from a second surface, as viewed in cross section along a circumference of the seal ring, and wherein the first surface is canted relative to an axis of the seal ring.

Embodiment 47

The seal ring, assembly, or plurality of seal rings of item 46, wherein the first surface is offset from the axis of the seal ring by at least 1°, such as at least 2°, at least 3°, at least 4°, at least 5°, at least 10°, at least 15°, at least 20°, at least 25°, at least 30°, or even at least 35°.

Embodiment 48

The seal ring, assembly, or plurality of seal rings of any one of items 46 and 47, wherein the first surface is offset from the axis of the seal ring by no greater than 75°, such as no greater than 70°, no greater than 65°, no greater than 60°, no greater than 55°, no greater than 50°, no greater than 45°, or even no greater than 40°.

Embodiment 49

The seal ring, assembly, or plurality of seal rings of any one of the preceding items, wherein the seal ring further comprises a hydrostatic relief pocket.

Embodiment 50

The seal ring, assembly, or plurality of seal rings of any one of the preceding items, wherein the hydrostatic relief pocket is disposed at least partially on the outer surface of the seal ring.

Embodiment 51

The seal ring or plurality of seal rings of any one of claims 1, 2, and 5-50, wherein the seal ring is adapted to couple with an annular member along the inner surface of the body.

Embodiment 52

The seal ring or plurality of seal rings of any one of claims 1, 2, and 5-50, wherein the seal ring is adapted to be disposed between a first component and a second component, and wherein an annular member is disposed between the seal ring and the first component.

Embodiment 53

The assembly of any one of claims 3, 6-8, and 13-50, further comprising:

an annular member disposed between the seal ring and the first component.

Embodiment 54

The seal ring, assembly, or plurality of seal rings of any one of claims 52 and 53, wherein the annular member has an initial radial height, as measured prior to installation, and an assembled radial height, as measured after installation, and wherein the initial radial height is greater than the assembled radial height.

Embodiment 55

The seal ring, assembly, or plurality of seal rings of any one of claims 52-54, wherein the annular member is adapted to operate in a state of compression.

Embodiment 56

The seal ring, assembly, or plurality of seal rings of any one of claims 52-55, wherein the annular member is adapted to bias the seal ring in a radially outward direction.

Embodiment 57

The seal ring, assembly, or plurality of seal rings of any one of claims 52-56, wherein the annular member comprises a polymer, such as a PTFE, a PEEK, PI, or a PAI.

Embodiment 58

The seal ring, assembly, or plurality of seal rings of any one of claims 52-57, wherein the seal ring has a cross-sectional shape selected from at least one of: a polygon, a rectangle, a square, an ellipsoid, an oval, or a circle.

Embodiment 59

The seal ring, assembly, or plurality of seal rings of any one of claims 52-58, wherein a seal effectiveness of the seal ring is higher in operation with the annular member as compared to without the annular member.

Embodiment 60

The seal ring, assembly, or plurality of seal rings of any one of claims 52-59, wherein the annular member has a width that is different than a seal width, $W_S$, of the seal ring.

Embodiment 61

The seal ring, assembly, or plurality of seal rings of any one of claims 52-59, wherein the annular member has a width that is equal to a seal width, $W_S$, of the seal ring.

Embodiment 62

A method of using a rotary system comprising:
removing a seal ring from a plurality of stacked seal rings, each seal ring having a body defining relief portion and including a tab, the tab of each seal ring extending beyond an innermost surface of the body and beyond a first side surface of the body;
installing the seal ring around a first component so as to form a preassembly, wherein the tab at least partially engages a relief portion of the first component; and
inserting the preassembly into a bore of a second component.

Embodiment 63

The method of claim 62, further comprising:
installing an annular member between the seal ring and the first component, wherein the annular member is adapted to bias the seal ring in a radially outward direction Embodiment 64

A seal ring comprising:
a body having an inner surface, an outer surface, and a first side surface; and
a tab extending from the body and adapted to prevent rotation of the seal ring relative to a component receiving the tab, wherein the tab extends axially beyond the first side surface, and wherein the tab is canted relative to a central axis of the seal ring Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:
1. A seal ring comprising:
a body having an inner surface, an outer surface, and a first side surface; and
a tab extending from the body and adapted to prevent rotation of the seal ring relative to a component receiving the tab, wherein the tab extends radially inward beyond the inner surface and axially beyond the first side surface, wherein the seal ring is adapted to couple with an annular member along the inner surface of the body, and wherein the annular member is adapted to bias the seal ring in a radially outward direction.

2. The seal ring of claim 1, wherein the seal ring further comprises:
   a relief portion adapted to accommodate a tab of an adjacent seal ring such that the first side surface of the seal ring directly contacts a second side surface of the adjacent seal ring.

3. The seal ring of claim 2, wherein the relief portion extends around an entire circumference of the body.

4. An assembly comprising:
   a first component;
   a second component; and
   a seal ring disposed between the first component and the second component;
   wherein the seal ring comprises a body having an inner surface, an outer surface, and a first side surface, wherein the seal ring comprises a tab extending radially inward beyond the inner surface and axially beyond the first side surface, and wherein the first component comprises a notch adapted to receive the tab thereby locking the seal ring from rotational movement in relation to the first component, wherein the seal ring is adapted to couple with an annular member along the inner surface of the body, and wherein the annular member is adapted to bias the seal ring in a radially outward direction.

5. The assembly of claim 4, wherein the seal rings comprises:
   a relief portion adapted to accommodate a tab of an adjacent seal ring such that the first side surface of the seal ring directly contacts a second side surface of the adjacent seal ring,
   wherein the tab is disposed at a first circumferential position on the body, wherein the relief portion is disposed at second circumferential position on the body, and wherein the first and second circumferential positions are axially adjacent one another.

6. The assembly of claim 5, wherein the relief portion defines a concavity in the body, and wherein the concavity has a shape generally similar to a shape of the tab.

7. A plurality of stacked seal rings, wherein at least two adjacent seal rings of the plurality of stacked seal rings each comprise:
   a body having an inner surface, an outer surface, a first side surface, and a second side surface generally opposite the first side surface;
   a tab extending radially inward beyond the inner surface and axially beyond the first side surface; and
   a relief portion adapted to accommodate a tab of an adjacent sealing ring such that the first side surface of a seal ring directly contacts the second side surface of the adjacent seal ring.

* * * * *